United States Patent [19]

Stempeck

[11] 3,945,025
[45] Mar. 16, 1976

[54] EXPOSURE CONTROL SYSTEM

[75] Inventor: John W. Stempeck, Belmont, Mass.

[73] Assignee: Polaroid Corporation, Cambridge, Mass.

[22] Filed: Nov. 21, 1974

[21] Appl. No.: 525,747

Related U.S. Application Data

[63] Continuation-in-part of Ser. No. 414,886, Nov. 12, 1973, abandoned.

[52] U.S. Cl. .................. 354/29; 354/23 D; 354/44; 354/50; 354/60 A; 354/230; 354/234
[51] Int. Cl.² ........................ G03B 7/10; G03B 9/42
[58] Field of Search ............. 354/29, 38, 44, 50, 51, 354/60 R, 230, 234, 271, 23 D

[56] References Cited
UNITED STATES PATENTS

| | | | |
|---|---|---|---|
| 3,680,460 | 8/1972 | Starp.................................. | 354/230 |
| 3,750,543 | 8/1973 | Eloranta et al. ...................... | 354/29 |
| 3,813,680 | 5/1974 | Wagensonner et al. .............. | 354/44 |
| 3,882,522 | 5/1975 | Erlichman.......................... | 354/23 D |

*Primary Examiner*—L. T. Hix
*Assistant Examiner*—Russell E. Adams, Jr.
*Attorney, Agent, or Firm*—David R. Thornton

[57] ABSTRACT

An exposure control system for photographic apparatus of a variety utilizing a pulse driven stepper motor to drive the light regulating elements of an exposure mechanism. The control system utilizes an exposure evaluating network, the output signal from which is converted to binary form and compared against the count output of counter means driven at a predetermined frequency. The system operates to count at one pulse frequency while simultaneously driving the stepper motor at a submultiple frequency until equality is reached with the binary representation. Supplementary counting continues at the one frequency in response to any deviation between the value of exposure derived by the exposure mechanism elements and the value of exposure represented by the binary representation. The deviation is accommodated for by a digitally derived delay corresponding therewith. In effect, a vernier form of binary regulation of exposure is provided.

24 Claims, 11 Drawing Figures

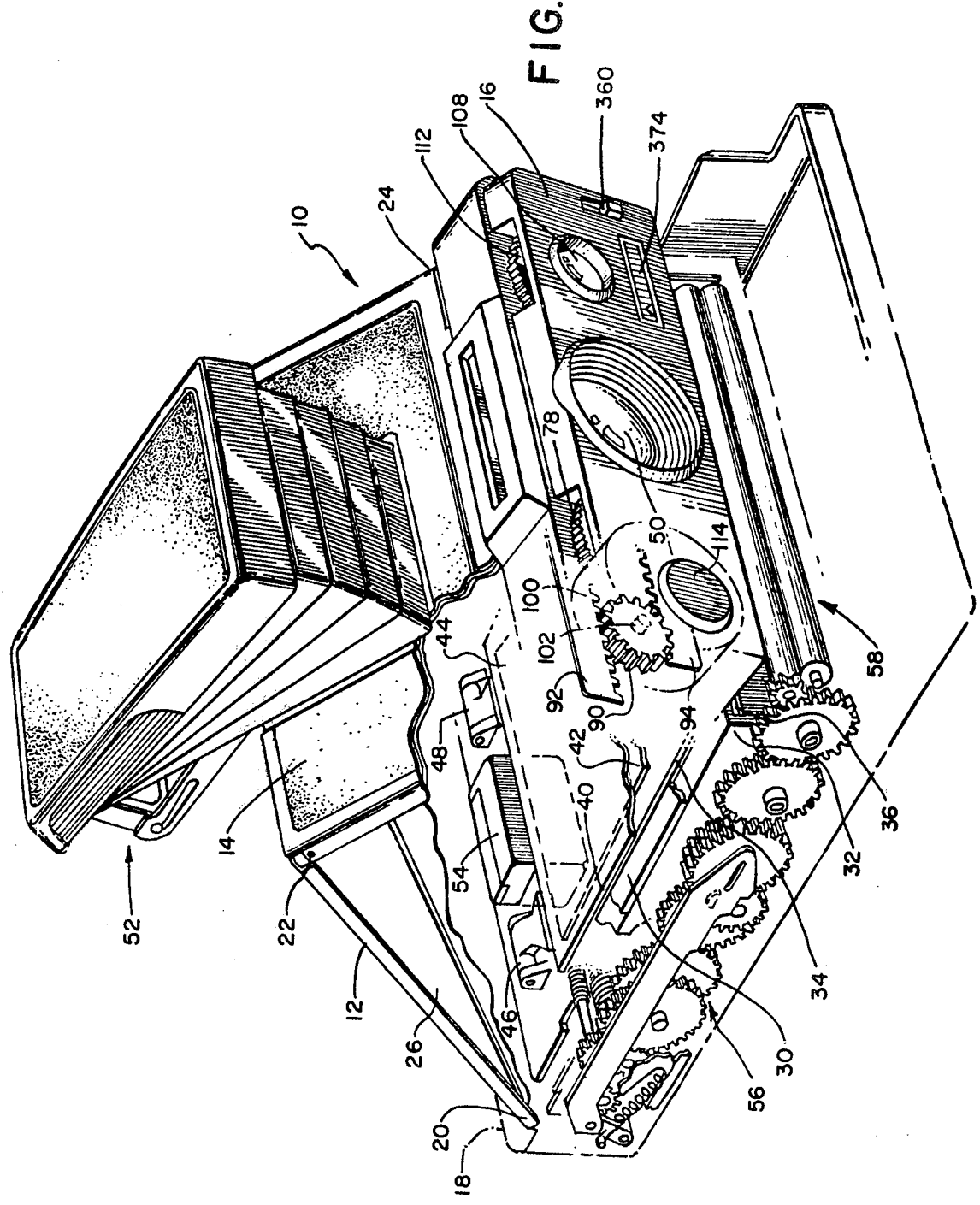

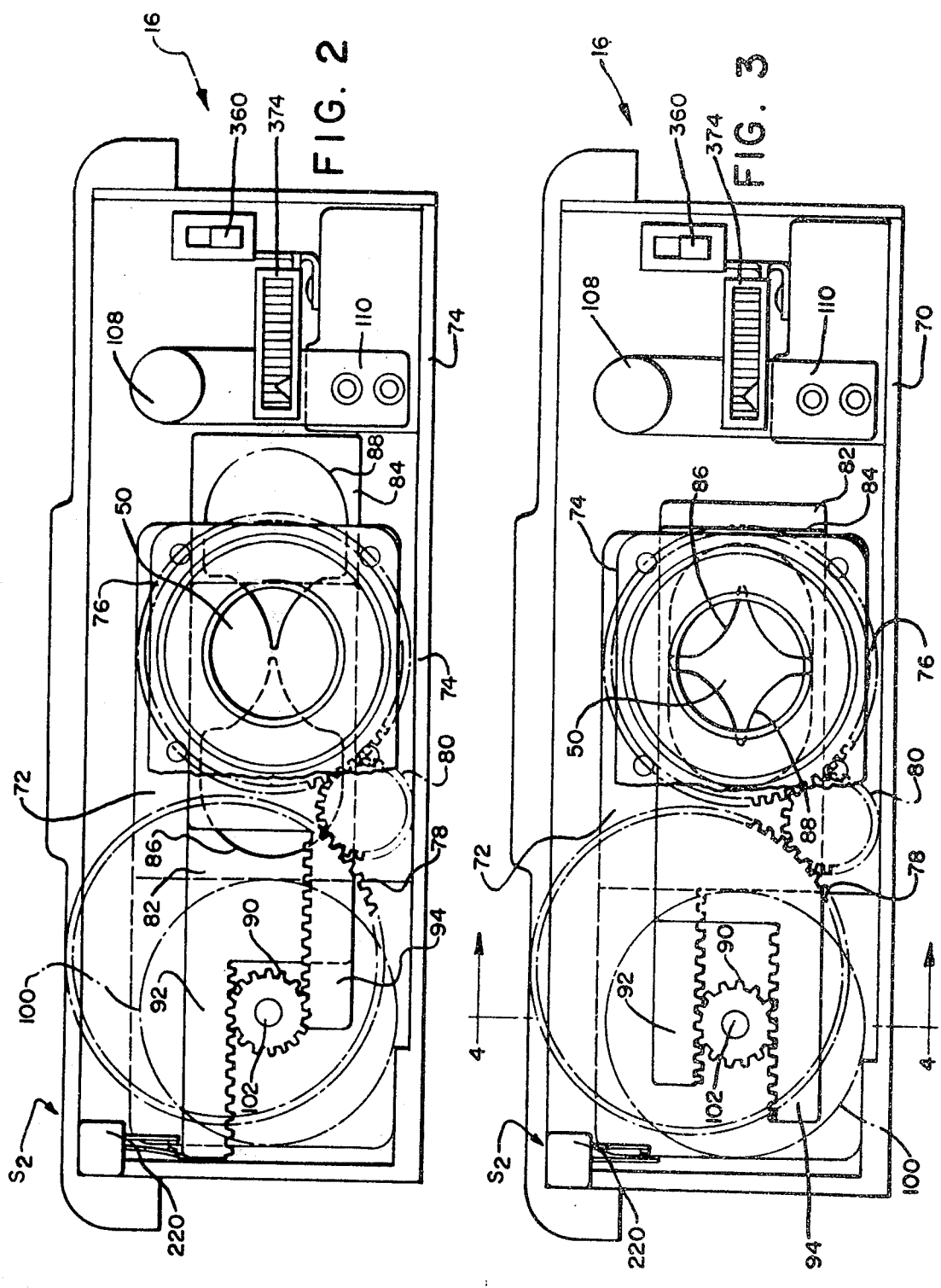

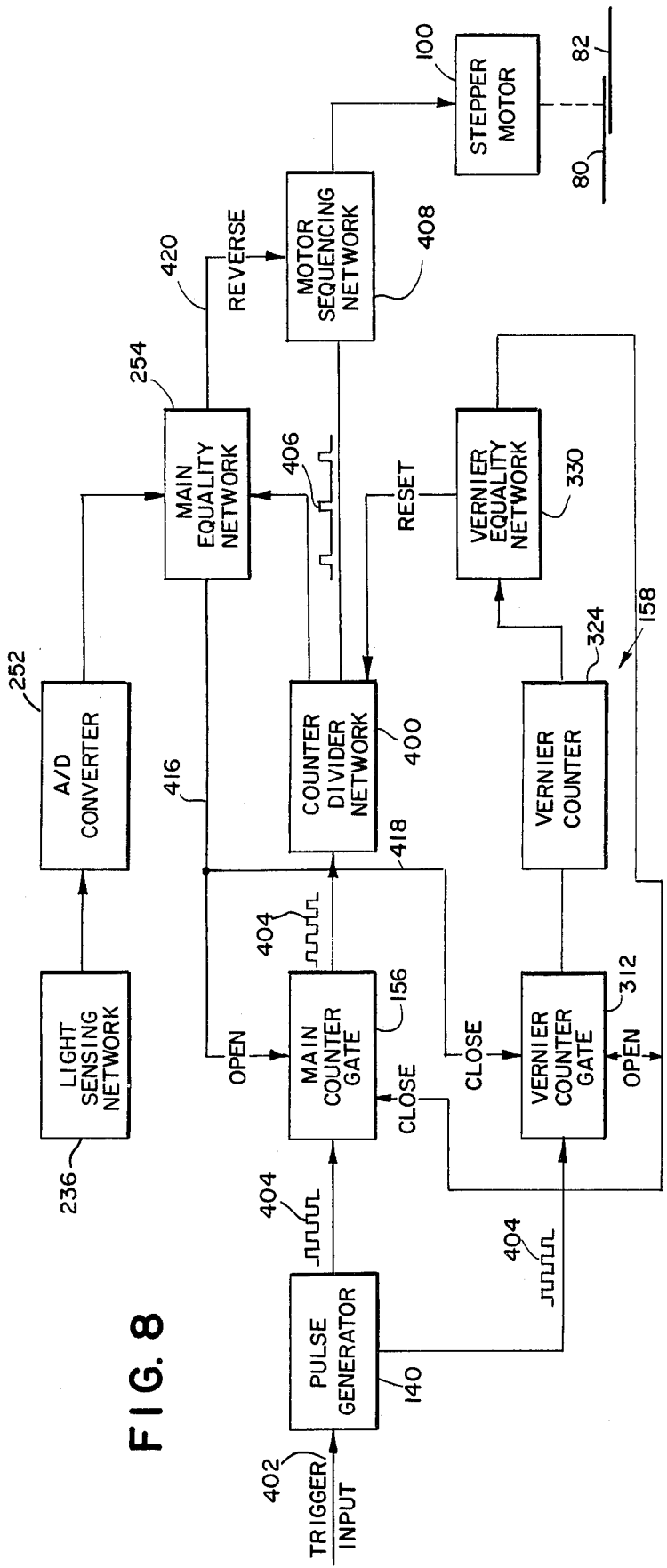
FIG. 8
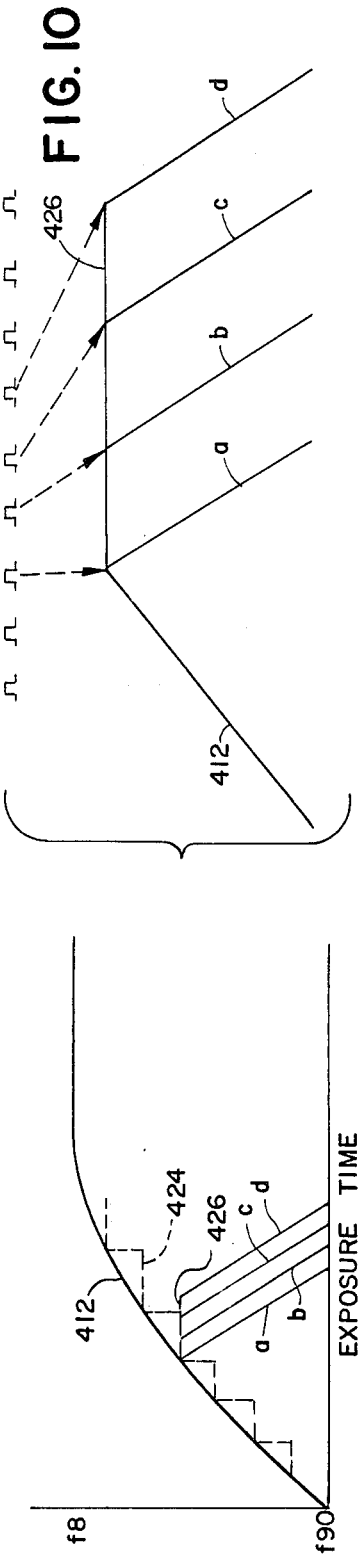
FIG. 10
FIG. 9

EXPOSURE CONTROL SYSTEM

CROSS REFERENCE TO RELATED APPLICATIONS

This application is a continuation-in-part of U.S. application Ser. No. 414,886, filed Nov. 12, 1973, now abandoned.

BACKGROUND OF THE INVENTION

Conventional shutter mechanisms are designed to utilize the advantageous characteristics of springs to provide drive for both the opening and closing movements of light regulating blades. These spring both provide a desirable consistency of dynamic performance as well as retain an advantageous capability for storing relatively high available energy. To store this energy, the springs are loaded as by winding and the requisite power for such winding is derived manually. In more common applications, manually derived power is delivered to the springs by a cocking hand crank or lever or through a relatively strong mechanical linkage connecting a film wind lever with the shutter mechanism.

As fully automated but highly compact cameras have been developed, the noted high energy storage capacity obtainable from manually loaded springs no longer remains available to shutter designers. For instance, the power for shutter mechanism drive necessarily must be derived from a relatively small battery located within the camera. The design of a resultant efficient low power drive shutter becomes even more involved where the device is called upon not only to automatically regulate an interval of exposure, but to provide a programmed automatic dual parameter (exposure interval and aperture) control. Further, the shutter mechanism may be called upon to function within the complex photographic cycle required of a fully automated single lens reflex camera by carrying out operations not associated with the image forming exposure of film.

A photographic cycle involving such automated reflex operation is described in U.S. Pat. No. 3,714,879 by E. H. Land, I. Blinow and V. K. Eloranta. The automated reflex operation therein requires that the camera shutter remain normally open, defining full aperture width for purposes of viewing and focusing. With the commencement of a photographic cycle, the shutter is required to fully close and remain closed while the optical path of the camera converts to an exposure mode orientation. Following such conversion, the shutter is required to carry out two parameter exposure regulation, following which the blades thereof remain closed as the components of the camera are automatically driven to alter the optical path to its initial viewing-focusing mode orientation. When the latter conversion is completed, the shutter mechanism is called upon again to reassume its open condition exhibiting maximum aperture width. To conserve energy from the limited battery power supply, current drain throughout a photographic cycle imposed from the shutter must be held to the lowest levels available. In effect, the automatic cameras must be fabricated to operate within a limited power supply profile during the course of each successive photographic cycle.

One approach to providing such shutter performance is described in a copending application for U.S. patent by I. Erlichman, entitled "Non-Cocking Springless Shutter Developing Two Parameter Exposure Regulation," Ser. No. 362,926, filed May 22, 1973, and assigned in common herewith, as well as in an application for U.S. patent by R. Kee, Ser. No. 362,664, entitled "Exposure Control System For Photographic Apparatus," filed May 22, 1973 and also assigned in common herewith. These applications describe an exposure control mechanism and related drive system in which a stepper motor is utilized to drive two coacting exposure mechanism blades about a camera optical path. The mechanism blades are configured to be directly driven from the output of the stepper motor and move when so driven in synchronism and correspondence to define a predetermined variation of aperture values over the cammera optical path. The shutter utilizes no springs and requires no cocking to impart the noted movement to the exposure mechanism blades. Further, it readily is adapted to use within involved photographic cycles requiring select optical path blockage during mode conversion procedures. Exposure regulation is provided by a control circuit utilizing a photosensitive element operating in conjunction with a secondary aperture opening formed within the exposure mechanism blades. With this arrangement, as the blades are moved to define varying apertures, corresponding aperture information is provided to the control circuit by synchronous variation of light input to a photosensitive element.

The stepper motor is driven from a closed or blocking position at the commencement of an exposure interval while scene lighting is being sensed at the photosensitive element. As the blades reach an appropriate apertural value, the control circuit commands the stepper motor to rotate in an opposite direction to terminate the exposure interval. With such an arrangement, scene light evaluation is carried out coincidently with stepper motor activation. Inasmuch as stepper motors are typically constructed having multiple stator phases in conjunction with a multiple pole rotor construction, they may be halted at predetermined magnetic detent orientations, each such orientation serving to position the exposure mechanism blades at a particular location defining a predetermined aperture value. In effect, the exposure mechanism blades may be driven through a series of steps or potential halting positions. The presence of such detent positions as well as the simplicity and substantial low mass of the system, allows for very high accuracy in blade positioning.

SUMMARY OF THE INVENTION

The present invention is addressed to an exposure control system and apparatus which enjoys a capability for enhanced operational versatility in conjunction with high exposure regulating accuracy. Utilizing a pulse energized drive for moving and positioning light controlling exposure mechanism blades or elements, the control system is ideally suited for use within photographic devices, as the thin, compact and fully automated single lens camera referred to above. In a preferred arrangement, this drive is present as a pulse driven stepper motor, the drive output of which is connected through a simple rack and pinion coupling to the light controlling blades of an exposure mechanism. These blades are so configured as to cooperate to define a progressive variation of aperture values over an optical path in the course of their movement from a terminal or first position.

Control over the stepper motor drive is carried out utilizing a circuit including a converter arrangement which responds to an exposure evaluating signal, before the commencement of an exposure interval, to derive a digital representation of that signal. The control system then drives the stepper motor in correspondence with the digital representation. As a consequence of this digital conversion feature, a considerable versatility for control technique is availed. For instance, the evaluating signal may be generated as a voltage value from a light sensing network to provide automated exposure control, or from an override arrangement wherein an exposure value signal is derived manually by establishing a select voltage value corresponding with an exposure value determined by the camera operator. By suppressing the output of the light sensitive network, the otherwise fully automatic exposure control system may optionally be operated in semi-automatic fashion.

As another feature and object, the invention provides an exposure control sytem incorporating a stepper motor drive for an exposure mechanism. Through the use of a converter, for instance of the analog-to-digital variety an exposure evaluating signal may be converted to a digital representation. A control arrangement of the system operates to count at a first pulse frequency until equality is reached with the digital representation. While this counting is carried out, the control simultaneously and synchronously derives drive energizing input pulses at a submultiple frequency which are introduced to the stepper motor. Accordingly, the stepper motor is driven at the submultiple frequency until such time as the noted equality is reached. Another network within the control arrangement is operative at the noted equality to respond to any deviation between the value of exposure derived by the exposure mechanism and the value of exposure represented by the noted digital representation. This network then delays exposure mechanism means actuation to terminate the interval of exposure for an interval of time which corresponds to that deviation. Accordingly, a counter arrangement is provided which asserts a vernier form of regulation over the development of a photographic exposure.

Another object of the invention is to provide an exposure control system which incorporates an exposure mechanism, the blades of which are movable from a first position to define a progressive variation or exposure apertures over the optical path. The system incorporates a drive arrangement in the form of a stepper motor which is energized by a pulse train of predetermined frequency. The system includes an exposure evaluating arrangement for providing an output signal corresponding with the exposure evaluation of a scene to be photographed. Additionally, the sytem includes a converter, preferably of the analog-to-digital variety, which provides a digital representation of the exposure evaluation. A control arrangement derives the noted energizing pulse drive in correspondence with the digital representation to define an interval of exposure. As a consequence of the preliminary derivation of a digital representation of the exposure evaluation of a scene, the structure of the exposure mechanism is simplified. For instance, information as to blade position otherwise derived through the movement of secondary aperture openings over a light sensing network may be eliminated. The system also enjoys a versatility in being receptive to optional manual insertion of an exposure evaluation.

Other objects of the invention will in part be obvious and will in part appear hereinafter.

The invention accordingly comprises the system and apparatus possessing the construction, combination of elements and arrangement of parts which are exemplified by the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a perspective representation of a fully automated photographic camera within which the exposure control system of the instant invention may be incorporated the figure having portions cut-away or revealed in phantom to show internal structure;

FIG. 2 is a front sectional view of an exposure control mechanism for the camera of FIG. 1 which may utilize the system and apparatus of the instant invention;

FIG. 3 is another view of the exposure control mechanism of FIG. 1 showing the components thereof as they may be oriented during an interval of exposure;

FIG. 8 is a block diagram of portions of the circuit diagram shown in FIG. 5;

FIG. 9 is a graph depicting typical opening and closing cycles of the shutter system; and FIG. 10 is a greatly enlarged portion of the graph of FIG. 9 showing the relationship between the closing cycles of the shutter system and the pulse logic.

DETAILED DESCRIPTION

Figure 4:
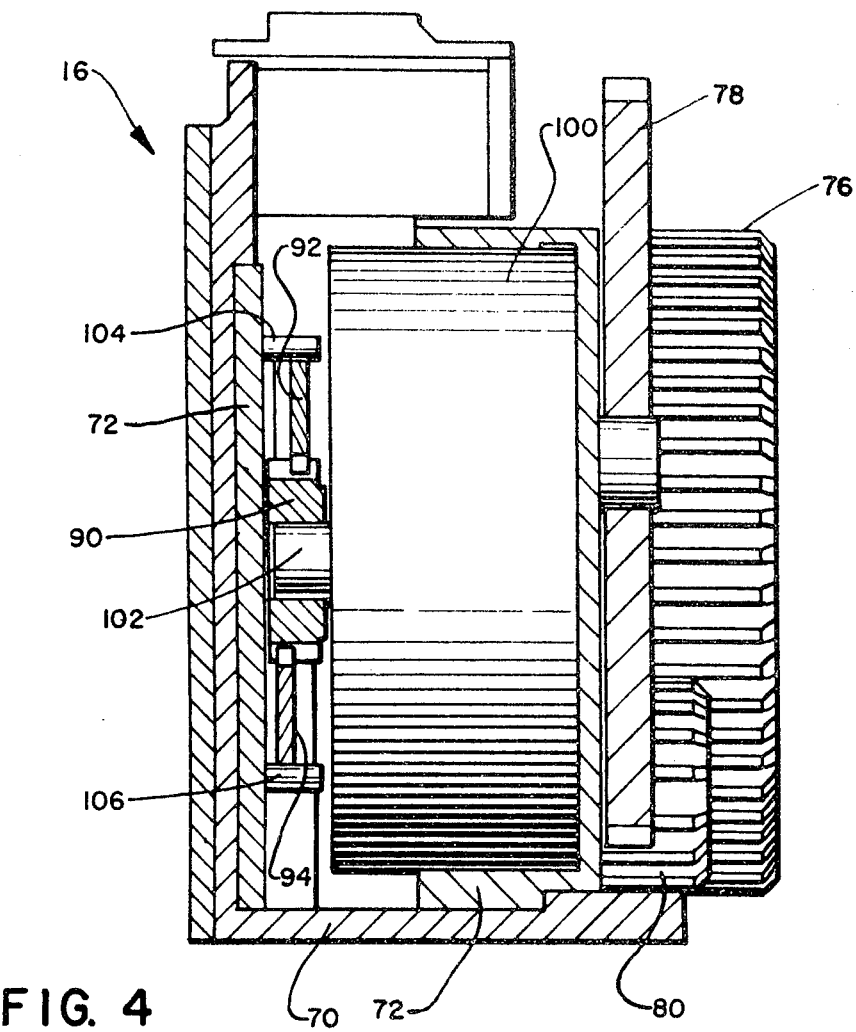
FIG. 4 is a partial side sectional view of the mechanism of FIGS. 1 and 2.

In the illustrated embodiment, the exposure control system of the invention is utilized within a single lens reflex camera 10, shown in FIG. 1, which includes a rear wall 12, a forward wall 14 and an exposure control housing 16, all pivotally associated with a base 18. The hinge connections (not shown) being positioned at axes 20, 22, 24 and the lower rear portion of housing 16. Walls 12 and 14 and housing 16 in conjunction with an opaque flexible bellows, a fragment of which is illustrated at 26, define an exposure chamber generally depicted at 28.

Base 18 includes an inner frame assembly, a portion of which is shown at 30. Inner frame assembly 30, as well as the outward portions of base 18, cooperate to provide structural support for numerous instrumentalities of the camera. For instance, frame 30 is configured to define a receiving chamber for retaining and securing a film laden cassette 32 at the bottom of exposure chamber 28. Cassette 32 is of generally flat configuration and contains a stacked assemblage of photographic film units, the uppermost one of which is positioned at an exposure plane immediately beneath inner frame 30. This exposure plane is located at the underside of a ridge 34 of cassette 32. The forward wall of cassette 32 is formed having an elongate slot 36 disposed thereacross. Slot 36 serves as an egress means providing for the sequential removal of each film unit following its exposure.

Camera 10 operates in modified reflex fashion, being convertible between viewing-focusing and exposure operational modes or orientations by a reflex assembly including a somewhat planar reflex reflecting component 40. Shown in an orientation for viewing and focusing, component 40 is configured having a mirror surface 42 mounted upon its underside and a viewing surface 44 positioned on or forming its upward surface. Connection of assembly 40 to inner frame 30 is provided by rearwardly disposed hinges as at 46 and 48.

In the viewing-focusing orientation shown, component 40 is positioned over ridge 34 of cassette 32 to secure the exposure plane of the camera and to provide for the establishment of a viewing optical path. This path extends from a taking lens at 50, thence to the reflecting surface of a mirror (not shown) affixed to the underside of rear wall 12, thence to viewing surface 44 from which it ultimately extends to a collapsible optical viewing assembly depicted generally at 52. A configuration suited for viewing surface 44 is described in U.S. Pat. NO. 3,690,240, while the assembly 52 and its related internal components are described in a copending application for U.S. patent by James G. Baker, filed Dec. 15, 1970, entitled "Reflex Camera and Viewing Device," Ser. No. 98,356, and assigned in common, now replaced by continuation application Ser. No. 264,933 issued Jan. 8, 1974 as U.S. Pat. No. 3,783,764.

In the course of a photographic cycle, following focusing and viewing, the above-described optical path orientation is altered by a procedure wherein exposure chamber 28 is initially secured by blocking the optical path at an exposure control mechanism within housing 16, then by spring driving assembly 40 such that it pivots about hinges 46 and 48 into a position substantially abutting against the inner surface of rear wall 12. In this exposure mode orientation, the optical path then extends from taking lens 50 and the noted exposure mechanism to mirror 42 positioned on the underside of reflex component 40, thence to the uppermost one of the film units positioned beneath ridge 34 of cassette 32. Following a controlled exposure of this uppermost film unit, exposure chamber 28 again is secured by an exposure mechanism within housing 16, following which reflex assembly 40 is drivably returned to its viewing-focusing position wherein the exposure plane of camera 10 again is secured. Once so secured, the exposure mechanism within housing 16 assumes an open orientation permitting viewing and focusing for a next ensuing photographic cycle.

As described in detail in U.S. Pat. No. 3,714,879, movement of reflex assembly 40 is carried out by select actuation of various instrumentalities including an electric drive motor as at 54 operating in conjunction with a mechanical actuating sytem including spring drives and an elongate gear train shown generally at 56 extending along one side of base 18. During operational mode conversion following an interval of exposure, as reflex assembly 40 is returned to its viewing-focusing orientation, gear train 56 serves to power the mechanical components required to remove an exposed film unit and process it through the rolls of a processing station depicted generally at 58. Film units which may be utilized with camera 10 are described, for instance, in U.S. Pat. No. 3,672,890.

Referring to FIGS. 2–4, the structure of a preferred exposure mechanism for use within exposure housing 16 of camera 10 is revealed in detail. Exposure housing 16 is formed having a rear casting 70 serving as a principal support for the components therewithin. More particularly, the center and one side portion of rear casting 70 serve to support a compound mounting fixture including an exposure mechanism mounting plate 72 which, in turn, supports a lens mounting bracket 74 at the center of housing 16. Bracket 74 serves to support an externally geared bezel 76 which is rotatable to carry out the focusing of taking lens 50. Focusing movement of lens bezel 76 is derived from a hand-manipulated externally geared, focusing wheel shown in outline form in FIGS. 2 and 3 at 78. Focusing wheel 78 is interconnected with the geared periphery of bezel 76 through an idler gear 80.

The rearward portion of lens mounting bracket 76 also serves to support two coacting exposure mechanism blades or elements 82 and 84. Blades 82 and 84, respectively, are formed having tapered aperture defining openings 86 and 88 which symmetrically overlap about the optical path of camera 10 or about the center of taking lens 50 to define an aperture opening. The requisite mutually reversed, synchronous and corresponding movements of blades 82 and 84 is realized by virtue of their common geared interconnection with a drive pinion 90. Note in this regard that blade 82 is formed having a rack extension 92, the geared teeth within which are meshed with those of pinion 90. Correspondingly, blade 84 is configured having a rack extension 94, the gear teeth within which are meshed with pinion 90 on an opposite side thereof from extension 92.

Rotational drive is imparted to pinion 90 from a stepper motor 100, the output shaft 102 of which is fixedly journaled within pinion 90. As is revealed in FIG. 4, motor 100 is of relatively thin dimension and is supported upon mounting plate 72 of the compound mounting fixture. To assure proper enmeshment between pinion 90 and rack extensions 92 and 94, guide pins 104 and 106 are provided and are shown extending from a rearward portion of plate 72. As is apparent from the structure described, when motor 100 is selectively energized from an energizing pulse train in the presence of an appropriate directional signal, it is capable of driving blades 82 and 84 from an orientation fully blocking the optical path of camera 10 (FIG. 2) toward open orientations (such as seen in FIG. 3) wherein openings 86 and 88 may serve to define a progressive variation of aperture values until full aperture opening is reached.

From the foregoing, it may be observed that a dual parameter exposure regulation can be provided by the mechanism of the invention. However, the aperture determining exposure parameter is a predetermined variable until such time as full aperture opening is achieved. An exposure interval is terminated by reversing the directional signal input to motor 100 and again energizing it with a drive pulse train to cause blades 82 and 84 to reassume the blocking orientation shown in FIG. 2. The value of exposure defined by the movement of blades 82 and 84 is regulated by an exposure evaluation arrangement which, for automated performance, includes a light evaluating network having light sensing elements positioned behind entrance optics including lens elements as at 108 supported from a bracket 110. As shown in FIG. 1, a form of trim may be utilized in connection with the light sensing station which is manually adjustable by a trim wheel as at 112. The control system of the invention also will be seen to retain a capability for manually inserting data to cause the exposure mechanism to define a given value of exposure.

Stepper motors as at 100 generally are motive devices which respond directly to a pulse of specified length and amplitude to provide a drive output. The position of the motor shaft 102 is directly proportionate to the number of these excitation or drive pulses applied. Rotational direction for the output of shaft 102 is controlled by electrical shading. Depending upon the use contemplated, the motors generally are designed utilizing multiple coils forming multiple stators, each of which is bifilar wound to allow four to eight stator phases. The rotors usually are formed in permanent magnet fashion having a plurality of pole points. A more comprehensive description of stepper motors as they are used in conjunction with exposure mechanisms is provided in the earlier noted copending application for U.S. patent, Ser. No. 362,926. In that application for patent, a stepper motor having a step angle of about 7½° operating to drive exposure mechanism blades between their terminal positions under about a twenty pulse energization in each direction is described as being adequate for the purpose at hand. A digital technique advantageously is utilized in controlling the operation of motor 100 to cause the exposure mechanism both to operate within the automatic reflex cycle described above as well as to regulate exposure.

Prior to describing the camera circuit in detail with regard to FIG. 5, shutter-diaphragm control during the exposure interval (with which this application is particularly directed) will be discussed with regard to FIG. 8. As can be seen from the latter figure, a pulse generator 140, upon being actuated by a trigger signal on line 402, delivers pulses 404 at a first frequency $f_1$ by means of a main counter gate 156 to a counter-divider network 400. The latter includes a pair of counters 172 and 176 which as later explained in detail in regard to FIG. 5 records the number of generator pulses and also provides drive pulses 406 at a submultiple frequency $f_2$ (preferably one/fourth of the generator frequency) to the stepper motor 100 by way of a motor sequencing network 408.

The sequencing network 408 is a conventional switching network, described in detail in the above-noted application Ser. No. 362,926, which is controllable to deliver the pulses 406 to the motor 100 in either of two sequences to impart forward or reverse directional control to the latter. The various networks including sequencing network 408 are cleared, or automatically reset to a proper starting condition just prior to or at reception of the exposure trigger signal such that the sequencing network is ready to provide a forward sequencing of the motor 100 in response to the pulses 406. This sequencing provides a rapid stepping action of the motor which, in turn, drives the shutter-diaphragm blades 80 and 82 to rapidly define progressively enlarging aperture values following an aperture opening curve 412, shown in FIG. 9.

In this embodiment, a light sensing network 236 provides an exposure value representative of scene brightness. This exposure value is converted by means of an A/D converter 252 to a digital value which is continuously compared with the pulse count of the counter-divider network 400 by means of a comparator network or main equality network designated herein at 254.

When equality is achieved between the coverter 252 and the counter-divider 400, a first equality or stop drive signal is provided on line 416 from the main equality network 254 to the main counter gate 156 so as to open the latter or, that is, render it non-conductive thereby cutting off the flow of pulses to the counter-divider 400. This, in effect, halts the stepper motor at the last step achieved and hence defines the maximum aperture achieved in accordance with the exposure value determined by the light sensing network 236. At this time, a branch line 418 of the line 416 conducts the first equality signal to a vernier counter gate 312 to render the latter conductive while the equality network 254 also signals the motor sequencing network 408 through line 420 to set the latter for subsequent reverse sequencing.

At this stage in the operation of the exposure system, the overall circuit in effect determines whether to immediately initiate a termination, or closing phase, of the exposure interval or to provide a continuation phase to be then followed by the closing phase. This continuation phase is employed to vary the exposure interval in compensation for the lack of precise dynamic progressive increase in aperture size. Stated otherwise, since the system cannot actually stop at or reverse at shutter openings intermediate the step positions, as later explained with regard to FIGS. 9 and 10, the exposure interval is extended at any given step in proportion to the time that the shutter system has been at that step prior to coincidence between the converter 252 and the counter-divider 254. This variation in exposure interval, which provides a time variation to compensate for the lack of smooth aperture progression, is provided by a vernier network shown at 158 in FIG. 8.

The vernier network 158 includes the vernier counter gate 312, a vernier counter 324 and a vernier equality network 330. As previously indicated, when the main equality network 254 reaches equality, it not only stops pulses to the counter-divider 400 but also renders the vernier counter gate 312 conductive which, in turn, passes generator pulses 404 to the vernier counter 324. Hence, the first equality signal in effect activates the vernier network 158. The vernier equality network 330 then compares the count of the vernier counter 324 with the time-on-step count (explained in detail below) of the counter-divider 400 and upon reaching equality provides a second equality signal, or, that is, a termination signal which resets the counter-divider 400 and re-opens the main counter gate 156 to permit step pulses 406 to again pass from the counter-divider to the stepper motor 100. At this time, however, the pulses 406 are delivered in a reversing sequence to drive the shutter-diaphragm blades 80 and 82 back to a blocking condition so as to terminate the exposure interval.

As later explained in more detail with regard to FIG. 5, the counter-divider 400 comprises a pair of counters 172 and 176 which provides a continuing count of the total number of generator pulses 404 throughout the opening phase of the exposure interval. Further, the least significant and next more significant output bit terminals designated A and B respectively of counter 172 in FIG. 5 are tapped to provide step pulses 406 to the drive motor. Hence, these output bits in effect provide a time-on-step count which indicates the time on that shutter step at which the counter-divider was stopped. That is, the indicated bits A and B trip four times for each motor pulse 406 such that the count of the bits A and B at the time of counter stoppage indicate within that shutter step how long after the step pulse the main equivalence has occurred or, stated otherwise, how long the system has been at that step. This time-on-step count is compared with the vernier counter 324, which comprises a two-bit counter. The latter is driven at the generator pulse rate 404 and in effect will reach equality and signal for the termination or closing phase after a time lapse which is directly proportional to the time on the step as explained below in regard to FIGS. 9 and 10.

Referring first to FIG. 9, it can be seen that the sutter opening traces out an exemplary curve as designated at 412, since the motor is normally driven at its slewing rate. In actuality, the motor is stepped in a manner shown by the dotted curve 424 but so rapidly that it carves out f stop values versus time closely following a continuous curve like that shown at 412. For clarity only a few steps are shown while in the preferred embodiment 20 steps are actually employed to drive from closed to a full open position. In any case, since the motor is magnetically detented, f stop values occurring intermediate the detents or steps (intermediate the intersections of both curves 412 and 424) can only occur during dynamic movement of the shutter blades. Hence, the system cannot stop and reverse at these dynamically achieved f stop values. Consequently, during the opening phase, when the stepper motor is stopped (due to an equivalence between the converter 252 and the counter-divider 400) the shutter system must be on a step as, for example, is designated at 426. Further, since there are four generator pulses or counting pulses 404 at frequency $f_1$, four different closing curves, $a, b, c, d$ may be generated depending upon at which pulse count the coincidence was achieved.

The pulse arrangement displaced across the step 426 is shown in FIG. 10 wherein pulse 1 represents a step pulse (at frequency $f_1$) which brings the shutter to the step 426. In this example, it is assumed that a main or first equivalence with the recorded digital exposure value is reached prior to the next step pulse, the fifth pulse at frequency $f_1$ such that on further step has occurred. This pulse 1 also represents a first count pulse of the selected step while pulses 2, 3 and 4 represent the remaining count pulses of that step.

Assuming an exposure value equivalence (between the counter-divider 400 and the converter 252) at pulse 1 (the step pulse) then the vernier equality network also indicates equality with the divider portion (bits A and B of counter 172) of the counter-divider 400, and immediate reversal or closing of the shutter system is provided as indicated by closing curve a. Where the exposure value equivalence occurs at pulses 2, 3 or 4, the reversal is delayed by an amount equal to the elapsed time at which main equivalence was achieved following the step pulse or, that is, the delay following the main equivalence is equal to the time on the step at which equivalence was initially achieved. The actual delay is, of course, provided by the vernier counter 324 which will achieve equivalence with the time-on-step count (bits A and B) of the counter-divider 400 after one to four pulses depending upon at which pulse of the indicated pulses 1, 2, 3 or 4 the counter-divider 400 was stopped.

Consequently, for a pulse 2 exposure value equivalence, a reversal or termination signal from the vernier equality network 330 is not provided until one pulse count (at $f_1$) later thereby providing a closing curve $b$ which originates at a time substantially coincident with pulse 3 of the generator. Hence, the reverse signal follows the stop signal by one pulse. Moreover, for a pulse 3 equivalence, the reversal signal is two pulses later producing curve $c$ and at a pulse 4 equivalence the reversal signal is three pulses later to produce curve $d$. Hence, in this embodiment, the delay in termination, or, that is the continuation phase of the exposure interval is equal to the elapsed time on the step when the stop signal was received. This provides an increased exposure interval when a step is reached to compensate for the fact that apertures intermediate the steps cannot be achieved.

In effect, the described delay provides an area under the curve 412 and the step 424 (representing film exposure) which is substantially equivalent to the area expected from the curve 412 alone if intermediate aperture sizes could be achieved. Hence, the variable delay corrects the program for the deviation from a smooth curve such as that shown at 412. Stated otherwise, the exposure value from the light sensing network is provided in accordance with an exposure program as represented by a curve as at 412. However, this exposure value is in fact only precise at the step pulses (the coincidence of curves 412 and 424) and must be corrected for aperture values which fall between such step pulses. The latter is provided for by the variable delay.

It should be understood that each step of the shutter system defines progressively larger predetermined aperture values, each occurring at progressively longer intervals of time following the initiation of the cycle, and with each step transition in effect substantially coincident with a step pulse. However, as is evident from FIGS. 9 and 10, the time interval at that selected aperture is then varied between a time less than to greater than the time at which the next step or next larger aperture would be achieved; and, in fact, provides a continuation phase so as to automatically increase the exposure interval in compensation for the deviation of the shutter system from the idealized shutter opening curve.

While the above-noted time variation could also be employed at the maximum aperture achievable by the blades 80 and 82, it would not be suitable for very low levels where an extended exposure interval is required. Hence, as explained below in regard to FIG. 5, an extended exposure network is employed for termination control in that event.

Figure 5:
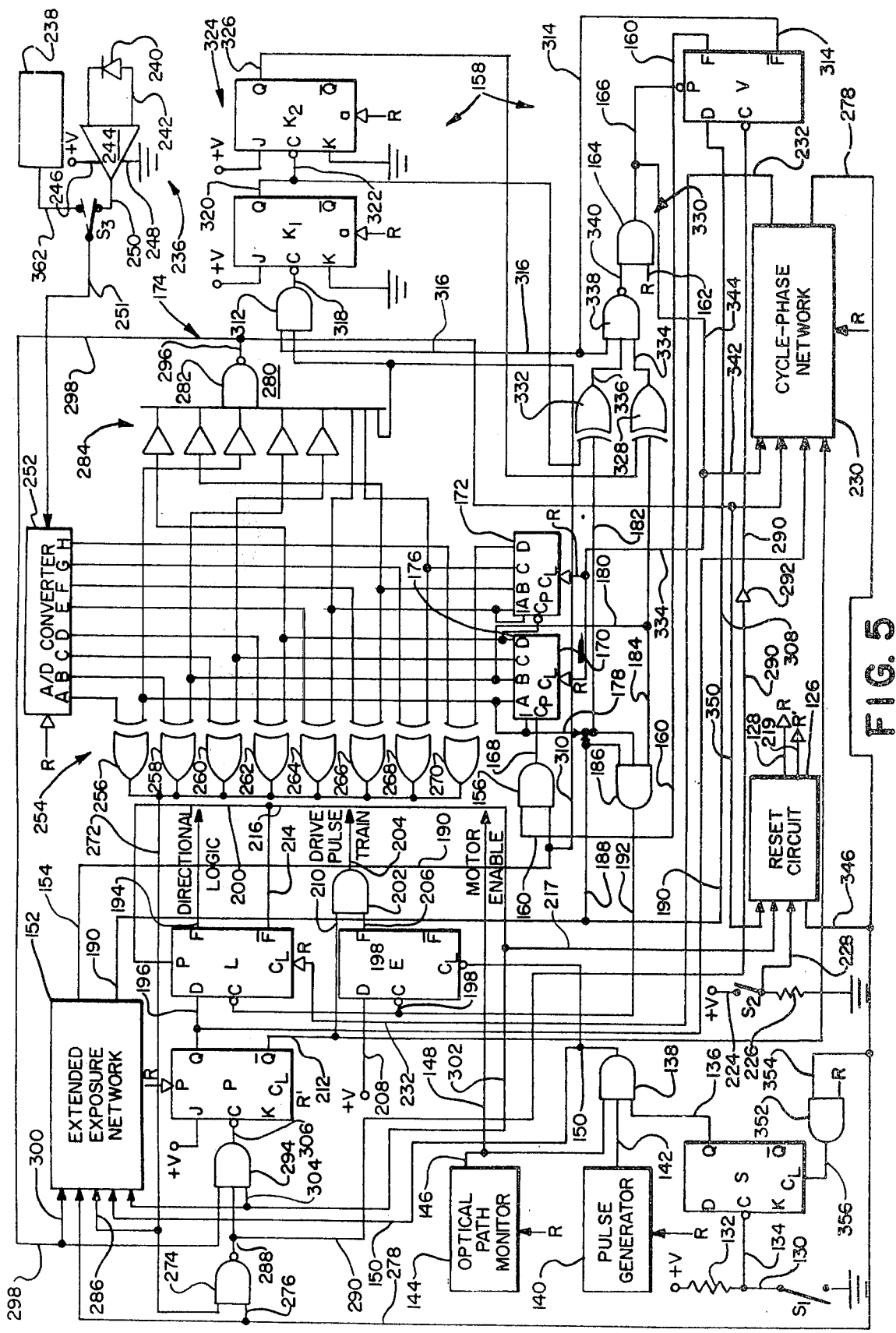
FIG. 5 is a schematic diagram of a control logic circuit incorporating the features of the instant invention.
Figure 6:
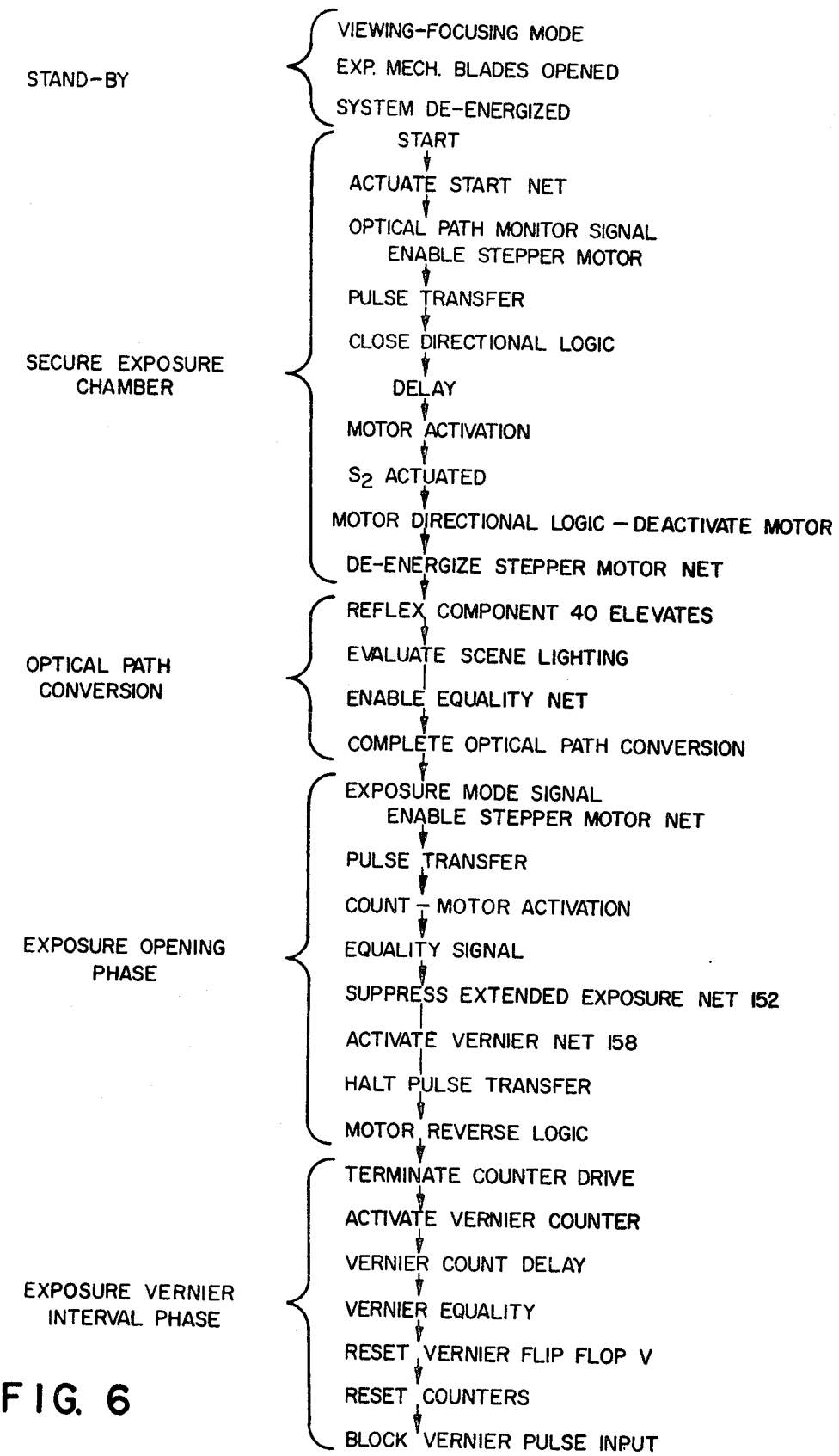
FIGS. 6 and 6A combine to form a chart showing the sequence of operational events carried out by the circuit of FIG. 5 in conjunction with the camera and exposure mechanism of FIGS. 1–4, the top of FIG. 6A being intended to continue from the bottom of FIG. 6.

Looking to FIGS. 5 and 6, the digital circuitry for carrying out the selective actuation of motor 100 are illustrated respectively by schematic diagram and operational event chart. To facilitate the description of the circuit of FIG. 5, Boolean numeration is utilized in addition to corresponding voltage signal values. In the latter regard, a "low" signal is considered to be one having a potential essentially at ground and may be represented by a logical 0. Conversely, a "high" signal is considered positive and may be depicted by a logical 1.

The circuit also will be seen to utilize bistable multivibrators. One form of such multivibrator is conventionally referred to as a J-K flip-flop. Generally, a J-K flip-flop is a complementing flip-flop having two added control signals, arbitrarily designated J and K, that serve to limit the conditions under which the flip-flop will change to the 1 and 0 states, respectively. This flip-flop also is characterized in providing an output change in time on the negative transition of clock inputs. The P or preset input, representing a d.c. set input to a given flip-flop, will cause its corresponding Q output to be a logical 1 where such P input is ground. A d.c. reset or clear input to a given such flip-flop will cause its Q output to be a logical 0 when that input is at ground potential. Of course, this output is in complement with its corresponding "not Q" or $\overline{Q}$ output.

Concerning the particular output logic of each of the J-K flip-flops, the Q output of such flip-flop will switch from a 0 state to a 1 state when J is 1 at the time of a clock or actuating pulse, although if the flip-flop is already in the 1 state, that is "reset," the binary value of J will not affect the flip-flop. Analogously, the flip-flop will switch from the 1 state at its Q terminal to a 0 state, while its $\overline{Q}$ will transition to 1 at such time as the K input is 1. When both the J and K terminals are 0, clock or actuating pulses will have no effect on the flip-flop.

The circuit also utilizes a D form of flip-flop. This flip-flop has an actuating (clock) input signal terminal C as in J-K flip-flop, but instead of the J and K input terminals, a single input terminal D is provided. The flip-flop output signal F becomes 1 to 0 according to whether D is 1 or 0, respectively, at the time of a 0-to-1 change in C. In effect, when utilized in a circuit in conjunction with J-K flip-flops, a D flip-flop serves to provide a pulsewidth lag feature.

As illustrated in FIG. 6, at the commencement of a photographic cycle, camera 10 is retained in a standby status wherein its control system is de-energized, its optical path is in a viewing-focusing configuration, blades 82 and 84 of the exposure mechanism define an aperture of maximum width and its exposure plane is secured or covered by reflex reflecting assembly 40. Such component orientation is altered as the operator of the camera depresses a start button, for instance as depicted at 114 in FIG. 1. This acutation serves to close a switch designated $S_1$ in FIG. 5 which is coupled within line 130 between ground, a current limiting resistor 132 and a voltage source +V. When closed, switch $S_1$ serves to actuate a start network by introducing a high-to-low signal along line 134 to the clock input terminal of a J-K flip-flop S. As a consequence, flip-flop S toggles to exhibit a high value at its Q output which is coupled, in turn, to line 136. This high at line 136 is introduced to one input terminal of an AND gate 138.

Simultaneously with the closure of switch $S_1$, the pulse generator, designated generally at block 140, introduces a train of energizing pulses of predetermined frequency, $f_1$, along line 142 to another input of AND gate 138. In practice, this frequency may be selected as about 2–3 Kh.

Another logic input to the circuit also is generated with the closure of switch $S_1$. More particularly, an optical path monitor network of the camera, as designated generally at block 144, generates a high output signal at line 146 representing that reflex reflecting assembly 40 is in a position securing the exposure plane of the camera. An optical path monitoring arrangement as at 144 is described in detail in a copending application for U.S. patent by J. P. Burgarella, P. P. Carcia and R. C. Kee, entitled "Photographic Control System and Apparatus Having Self-Monitoring Features" filed Dec. 29, 1971, Ser. No. 213,303 and assigned in common herewith, now issued on Nov. 27, 1973 as U.S. Pat. No. 3,774,516. The high signal at lien 146 is introduced to the input of AND gate 138 and also through line 148 to an enabling network (not shown) serving to provide power for motor 100. Accordingly, the motor is enabled to operate in the presence of an energizing pulse input and a directional logic input Powering of the control circuit with the closure of switch $S_1$ also activates a reset circuit designated functionally by block 126. This circuit generates an electrical transition which serves to align various elements of the circuit, thereby assuring their proper output state at appropriate time within a photographic cycle. The output of reset circuit 126 is represented at line 128 by an arrow and the letter R. To simplify the drawing, the transition at line 128 is represented where it is introduced throughout the circuit by a similar R associated with an arrow.

The presence of high or 1 values at lines 146 and 136 serves to gate or pass energizing pulses at line 142 through gate 138 to line 150. Line 150 leads, in turn, to an extended exposure control network depicted functionally at block 152. Described in detail in a copending application for U.S. patent by J. W. Stempeck, entitled "Exposure Control System" Ser. No. 414,887 filed of even date herewith and assigned in common herewith, network 152 serves to insert a particular form of exposure regulation under conditions wherein an exposure interval is continued beyond a point in time wherein blades 82 and 84 reach a maximum or terminal open aperture condition. For the present description, however, network 152 passes the pulse train from output line 154 to one input of an AND gate 156. The opposite input to AND gate 156 is high at this time and is introduced from a D flip-flop, V, present within the vernier network identified generally by arrow 158. Connection between flip-flop V and AND gate 156 is provided by a line 160 extending from the F terminal of the latter. The signal at line 160 is high at this time. This high signal at line 160 is established by virtue of the presence of the earlier noted transition from reset circuit 128 at input line 162 of AND gate 164. The transition is conveyed to the preset terminal P of flip-flop V to provide the high value at output terminal F and line 160.

The high input to gate 156 from line 160 serves to permit the gating or passage of a pulse train at frequency, $f_1$, from line 154 through line 168 to serially paired four-bit binary or "ripple through" counters 170 and 172.

Forming part of an exposure evaluation network 174, counters 170 and 172 respond to and, in binary manner, monitor and record the number of pulses ($f_1$) being introduced from line 168. The resultant count of counters 170 and 172 is represented as output bit information at their respective output terminals A–D. Note that counters 170 and 172 are serially coupled by interconnecting most significant output bit D of counter 170 through line 176 to the clock input terminal $C_P$ of counter 172.

The least significant and next more significant output bit terminals A and B of counter 170 are tapped, respectively, by leads 178 and 180 which, respectively, are coupled with lines 182 and 184. Lines 182 and 184 are connected to two of the inputs of a three-input AND gate 186. The third input to gate 186 also is a high at this point in a photographic cycle and is introduced from along lines 188 and 190 which, in turn, connect with extended exposure network 152. The particular derivation of this high value at line 190 as well as the input at line 154 from network 152 is described in detail in the noted copending application for U.S. patent, Ser. No. 414,887. Inasmuch as lines 178 and 180 are coupled with terminals A and B of counter 170, a pulse train is developed at lines 182 and 184 having a frequency $f_2$ representing a submultiple of the frequency at pulse generator 140. For instance, in the arrangement shown, this frequency, $f_2$, is one-fourth of the frequency $f_1$. With the presence of a high signal at line 188, the pulse train at frequency $f_2$ is passed through AND gate 186 to line 192.

The pulse train at frequency $f_2$ at line 192 is used ultimately to drive stepper motor 100; however, prior to its introduction to the motor, a high directional logic signal is introduced to the directional control network thereof from line 194. Line 194 is coupled to the F output terminal of a D flip-flop designated L. The D input terminal of flip-flop L, in turn, is coupled through line 196 to the Q output terminal of J-K flip-flop P. Note that the J input terminal of flip-flop P is connected to +V and its preset terminal P is coupled for response to the output of reset circuit 126. Accordingly, at the commencement of a photographic cycle, a 1-to-0 transition is witnessed at preset terminal P which causes output Q to assume a 1 state. Line 192 from gate 186 is coupled to the clock input C of flip-flop L. Accordingly, with the presence of the initial pulse of this train, the high value at line 196 is "clocked" or passed through flip-flop L to provide the necessary high output at line 194. Motor 100 has now received a directional logic signal for causing blades 82 and 84 to be driven to a fully closed orientation. As the high value is derived at the F output terminal of flip-flop L, its corresponding terminal $\overline{F}$ converts to a low or 0 value, which signal is witnessed through lines 214 and 200 at preset terminal P. Inasmuch as the preset input terminal P of flip-flop L is held at a 0 or low value, the high output at line 194 is "clamped" at that value.

The pulse train to drive motor 100, ultimately, is gated through AND gate 202, thence to the motor from along line 204. However, gate 202 is connected so as to block such passage until assurance is had that the reversing or high signal has been developed at line 194. One input to gate 202 is present at line 206, which, in turn, is coupled to the output terminal F of D flip-flop E. The D input terminal of flip-flop E is coupled through line 208 to +V, while its clock input C is connected with pulse train line 192. Accordingly, upon receipt of one of the pulses at line 192, flip-flop E passes the high value at line 208 to be present at line 206. The opposite input to gate 202 at line 210 is low at this time, in consequence of its connection through line 212 to the $\overline{Q}$ output of J-K flip-flop P. This output at line 212 alters to a high value at such time as reset circuit 126 receives a selective actuation from the $\overline{F}$ terminal of flip-flop L through lines 214, 216 and 217. This selective resetting is represented as R' at line 219 extending from circuit 126. Accordingly, flip-flop P toggles to produce a high at lines 212 and 210, thereby causing gate 202 to pass the energizing pulse train along line 204. As is noted in FIG. 6, the above-described development of directional and drive signals at lines 194 and 204 serve to provide a form of delay intermediate to the closing directional logic supplied to the motor and its activation from the pulse train.

Blades 82 and 84 are driven toward their fully closed position shown in FIG. 2 and, as the blades approach their fully closed position, extension 92 of blade 82 contacts resilient leaf 218 of a normally closed switch $S_2$. Leaf 218 is mounted in cantilever fashion from an insulative base 220, fixed, in turn, to rear casting 70. With such contact, leaf 218 is moved from electrical contact with resilient leaf 222 also extending downwardly from base 220.

Returning to FIG. 5, switch $S_2$ will be seen to be reproduced as coupled within a line 224 between +V, a resistor 226 and ground. The resultant low transition at line 228 is witnessed by reset circuit 126 to, in turn, produce a pulse or transition at its output 128. In consequence, the appropriate components of the circuit are reset as discussed earlier, including, a cycle phase network depicted generally at block 230. Network 230 serves the function of monitoring the exposure mechanism operation of the circuit and provides an output representing the commencement and termination of an interval of exposure. The network is described in detail in the aforementioned U.S. patent application Ser. No. 414,887.

Network 230 generates a low signal value at its output line 232 which is introduced to the clear terminal, $C_L$, of flip-flop L. As a consequence, output terminals F and $\overline{F}$ of flip-flop L assume high values. As the $\overline{F}$ output of the flip-flop at line 214 transitions to a high, the resultant high is witnessed from along line 200 at preset terminal P thereof. The earlier established clamp is removed and the 0 value at the clear terminal causes flip-flop L's F terminal to reassume a low signal value for developing directional logic to cause blades 82 and 84 to be driven toward open aperture orientations.

The switch $S_2$ development of a reset signal at line 128 from network 126 also causes optical path monitor circuit 144 to convert its output signal at line 146 from a high to a low value. As a consequence, the input pulses introduced from line 142 to AND gate 138 are blocked. Energizing drive pulses to motor 100 at line 204 are, in turn, blocked. As may be noted in FIG. 6, motor directional logic has now been re-established for opening the exposure mechanism blades and motor 100 has been deactivated. Additionally, motor enabler line 148 assumes a low value to de-energize the stepper motor network.

The exposure control system now operates to provide optical path conversion wherein reflex reflecting component 40 is spring driven to an exposure orientation against rear wall 12 of camera 10. As noted in FIG. 6, as reflex component 40 elevates, scene lighting is evaluated and an equality network is enabled.

Returning to FIG. 5, as camera 10 converts between a viewing-focusing mode and an exposure mode, the light sensing network depicted generally at 236 and forming part of exposure evaluating function 174 commences to evaluate scene lighting and produce a steady state voltage level signal representative thereof. This voltage level signal also can be evolved manually as discussed hereinafter from a manually set control network as depicted generally by block 238. Network 236 includes a photosensing element in the form of a silicon photodiode 240 which is coupled within line 242 between the input terminals of a logarithmic amplifier 244. Amplifier 244 is connected to +V through line 246 and to ground through line 248. The photodiode 240 is positioned behind the entrance optics of camera 10 as shown at 108 in FIG. 1. The output of amplifier 244 is present in line 250 and is introduced to the analog-to-digital converter 252 from switch S₃ and line 251. Converter 252 responds to steady state voltage levels produced at line 250 to convert them to a proportionate binary representation. This generally is carried out through comparison networks or the like and the binary representation is presented at output terminals A–H. Converter 252 is enabled from reset circuit 126. Through the use of a logarithmic amplifier at 244, lower binary numbers will be produced at converter 252 in response to higher scene brightness levels.

The output terminals A–H of converter 252 are coupled as shown through the equality network depicted generally at 254 as well as with counters 170 and 172. Network 254 is formed as an array of exclusive OR gates 256–270, one input terminal of each being coupled to a respective output terminal A–H of converter 252. The opposite input terminals of gates 256–270, respectively, are connected with output terminals A–D of paired counters 170 and 172. With the arrangement, when the outputs of counters 170 and 172 reach a binary equality with the exposure evaluation binary value at counter 252, a high signal value will be witnessed at output line 272 of equality network 254. Line 272 is coupled to a NAND gate 274, the opposite input to which extends from line 276 and line 278 to the output of cycle phase network 230. Network 230 serves to enable equality network 254 by introducing a high value at lines 276 and 278 at this point in a photographic cycle. Accordingly, any high output at line 272 representing an equality signal will be passed through gate 274. The high value at line 278 also serves to enable extended exposure network 152 so as to render it operative in the event of an exposure requiring full aperture opening.

As shown in FIG. 6, upon the completion of optical path conversion camera 10 enters an exposure opening phase in which blades 82 and 84 are driven by motor 100 toward open aperture orientations. This phase is commenced with the development of an exposure mode signal at line 146 from optical path monitor 144. The resultant high at line 146 is introduced along line 148 to enable the stepper motor network and to the input of gate 138 to again permit passage of pulses from line 142 and pulse generator 140. The pulse train is witnessed at line 150 which, as before, extends through network 152 and along line 154 to AND gate 156. The high value at line 160 remaining high, the pulse train at line 154 passes gate 156 and is introduced through line 168 to paired counters 170 and 172. Counters 170 and 172 commence to count and continue to do so until the binary value of their output terminals A–D reaches equality with the binary valuation at converter 252. Simultaneously and in synchronism with this counting, the least significant and next least significant output of counter 170 is tapped, as before, by lines 178 and 180. The resultant submultiple pulse train, $f_2$, is introduced through lines 178 and 182 to the input of AND gate 186. The third input to gate 186 is derived, as before, from network 152 through lines 190 and 188. Gate 186 passes the energizing pulse train along line 192 to the clock input of flip-flop L. Recall that the motor directional logic signal at line 194 is low, having been converted thereto at the opening of switch S₂. The pulse train at line 192 also is introduced from line 198 to the clock input of D flip-flop E. As a consequence, the high value signal at line 208 is passed through to the F terminal thereof and presented from line 206 to AND gate 202. The opposite input at line 210 of gate 202 remains high. Accordingly, energizing drive pulses are introduced to motor 100 from along line 204.

The output terminals A–H of A/D converter 252, as well as the corresponding respective output terminals A–D of counters 170 and 172, are coupled to the input of a terminal position monitor network shown generally at 280. Network 280 is formed of a multiple input NAND gate 282, the inputs of which are coupled with appropriate output terminals of paired counters 170 and 172. Through the use of an array of inverters as shown generally at 284, gate 282 will respond to a binary valuation or representation at counters 170 and 172 which corresponds with a position of blades 82 and 84 representing their maximum open aperture condition.

In the discussion to follow, the control circuit is described as it operates under conditions wherein an equality condition is reached at network 254 before blades 82 and 84 reach their terminal position. Accordingly, as depicted also in FIG. 6, the high equality signal at line 272 is introduced through line 286 to extended exposure network 152 to suppress its output and is further introduced from line 272 to one side of NAND gate 274. Inasmuch as the signal from cycle phase network 230 at line 276 also is at a high value, a resultant low signal appears at line 288, the output of gate 274. Note that the signal at line 288 is present under the conditions wherein cycle phase network 230 establishes that an exposure cycle opening phase is underway and wherein an equality signal has been reached. The low signal at line 288 also is witnessed at line 290, is inverted to a high at 292 and is introduced to the clock input of a D flip-flop V of vernier network 158. As a consequence, vernier network 158 is activated.

The low signal at line 288 also is introduced to one input of AND gate 294. A second input to gate 294 is derived from gate 282 of terminal position monitor 280. Under conditions wherein a terminal position is not reached by blades 82 and 84, the output of gate 282 at line 296 is high and is introduced through line 298 to gate 294. Simultaneously, this high value is introduced through line 300 to extended exposure network 152. However, network 152 will have been suppressed, as described above, upon generation of the equality signal at line 272. The third input to gate 294 is derived from lines 302 and 304 which carry a high signal at this time by virtue of their connection with the F̄ output terminal of flip-flop L through line 214.

With the noted inputs to gate 294, the output thereof at line 306 transitions from a high to a low and is witnessed at clock input terminal C of flip-flop P. In consequence, flip-flop P passes a high signal to its output terminal Q at line 196. The corresponding output Q̄ thereof at line 212 assumes a low value which, in turn, is witnessed through line 210 at gate 202. Pulse transfer from gate 202 is halted to stop motor 100.

The final drive pulse at line 192 also clocks flip-flop L such that the output thereof transitions to a "high" to provide for appropriate directional drive of motor 100 at such time as it is again energized to move blades 82 and 84 into their light blocking orientation.

As depicted in FIG. 6, the exposure cycle now enters an exposure vernier interval phase. Looking to flip-flop V, with the presence of a transition from low to high at line 290 leading to the clock input C, the output terminals thereof convert such that terminal F toggles to a low or 0 value which is witnessed at line 160, and corresponding terminal $\overline{F}$ converts to a high or 1 value. This alteration takes place inasmuch as input terminal D of the flip-flop is low at this time by virtue of its connection to output line 190 of network 152. Output terminal F of flip-flop V, now at a low value, is connected through line 160 to gate 156. Accordingly, with the presence of the noted low signal thereat, gate 156 halts the transfer of pulses at frequency $f_1$, to counters 170 and 172. However, line 154, carrying such pulse train also is coupled through line 310 to one input of AND gate 312 of vernier network 158.

The corresponding or $\overline{F}$ terminal of flip-flop V is coupled through lines 314 and 316 to the opposite input of gate 312. The high signal value thereat permits the passage of pulse train $f_1$ through line 318 to the clock input C of J-K flip-flop $K_1$. The J input terminal of flip-flop $K_1$ is coupled with +V, while its K terminal is coupled to ground.

The Q output terminal of flip-flop $K_1$ is, in turn, coupled through lines 320 and 322 to the clock input C of a second J-K flip-flop $K_2$. The J input terminal thereof is coupled with +V, while the K input terminal is coupled to ground. Thusly interconnected, it will be seen that flip-flops $K_1$ and $K_2$ function as a two-bit counter responsive to the pulse train input at line 318 at frequency $f_1$. Accordingly, the pair of flip-flops are identified generally at 324 as a "vernier counter."

The Q output terminal of flip-flop $K_2$ is coupled through line 326 to one input of an exclusive OR gate 328 within a vernier equality network shown generally at 330. Additionally, output Q of flip-flop $K_1$ is coupled by line 320 to one input of another exclusive OR gate 332 within network 330. The opposite input to gate 332 is coupled through line 182 to the least significant bit output A of counter 170, while the second input to gate 328 is coupled through line 184 to the second more significant output bit B of counter 170.

Thus interconnected, the respective outputs at lines 334 and 336 of gates 328 and 332 will assume a high state at such time as the values at lines 320 and 326 of vernier counter 324 are in equality with the outputs of terminals A and B of counter 170. Accordingly, network 158 is capable of asserting a delay ranging from 0 to the time interval represented by the acceptance of four pulses at frequency $f_1$ by vernier counter 324. As previously indicated, this form of vernier alteration of the exposure value defined by blades 82 and 84 permit greater accuracy of the control system. For instance, blades 82 and 84 will be stopped at a detent position representing a step orientation of the rotor of motor 100. In effect, any deviation between the value of exposure derived at exposure evaluating network 174 along with A-to-D converter 252 and the exposure defined by blades 82 and 84 is accommodated for through the addition of a time interval exposure parameter.

A vernier equality signal, representing a high value at lines 334 and 336, is passed through NOR gate 338 in consequence of the existing high signal value inserted thereto from line 316. The resultant low value at line 340 is presented to one input of AND gate 164. The opposite input thereto at line 162 will have remained high, and the resultant low signal is gated along line 166 to preset terminal P of flop-flop V. Flip-flop V is preset to its initial state wherein output terminal F is high and terminal $\overline{F}$ is low.

The low value at line 166 is directed through line 342 to cycle phase network 230 and also through line 344 to the reset inputs R of counters 170 and 172 to return their output terminals A–D to a 0 state. Additionally, the vernier pulse train input at frequency, $f_1$, as directed through gate 312 is blocked by virtue of the presetting of flip-flop V. In this regard, with the reverting of output $\overline{F}$ to a low value, the resultant low signal at lines 314 and 316 blocks pulse train passage at gate 312.

Figure 6A:
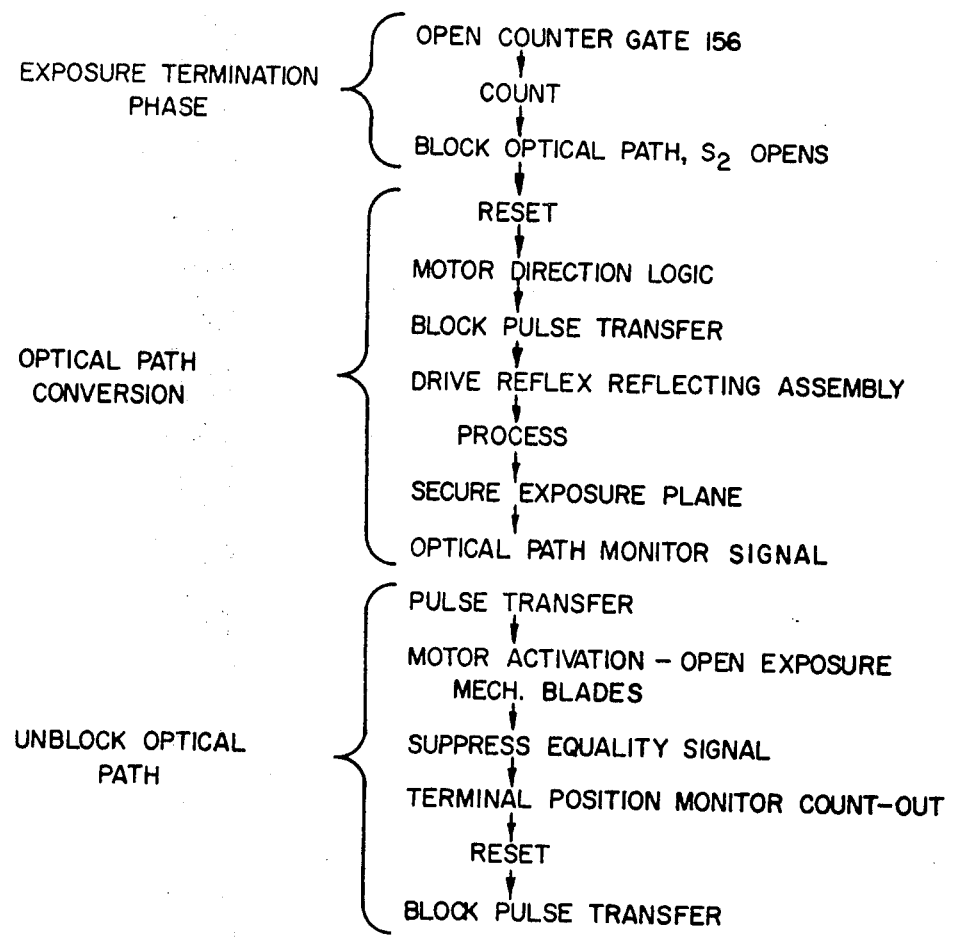

As shown in FIG. 6A, the photographic cycle now commences an exposure termination phase. With the development of a high value at the F output terminal of flip-flop V, line 160, in turn, assumes a high state to unblock the passage at gate 156 of pulses from along line 154. Accordingly, the pulse train at frequency $f_1$ passes from line 168 to paired counters 170 and 172. As before, counting ensues. Drive pulses at frequency $f_2$ are derived by tapping terminals A and B of counter 170 from lines 178 and 180. Inasmuch as line 188 extending from extended exposure network 152 output line 190 remains high, the pulse train is transferred along lines 192 and 198 to the clock input C of flip-flop E. Line 210, now carrying a high signal, the pulse train is passed from output terminal F of flip-flop E through gate 202 and to motor 100 from along line 204. Motor 100 commences to drive blades 82 and 84 toward their fully closed blocking orientation shown in FIG. 2. The low vernier equality signal at line 166 also is witnessed along line 342 and is directed to cycle phase network 230. Network 230 responds to assume a signal condition representing the commencement of the exposure termination phase. Additionally, operating from lines 278 and 346, network 230 serves to actuate reset circuit 126 to reset select components of the circuit as identified by the letter R. Inasmuch as output terminal F of flip-flop L is already at a 1 state, the resetting thereof does not alter the high directional logic signal at line 194.

As blades 82 and 84 reach their terminal position, switch $S_2$ again is opened and the entire circuit is reset. With this resetting upon the opening of switch $S_2$, directional flip-flop L is reset to cause the output at line 194 to go low. This is carried out because with the resetting, a low input is asserted from line 200 to the preset terminal causing both terminals F and $\overline{F}$ to go to 1 thereby removing the earlier asserted clamp. This, in turn, causes terminal F to assume a 0 signal.

Optical path monitor 144 is designed to respond to an actuation of reset circuit 126 as it is derived only from the opening of switch $S_2$. Accordingly, with the closure of blades 82 and 84 at this point within a photographic cycle, optical path monitor function 144 causes motor 54 to be energized to drive reflex reflecting assembly 40 into an orientation wherein the exposure plane of the camera is blocked. This orientation also re-establishes the viewing-focusing optical path of the camera. Concurrently with the noted optical path conversion, an exposed film unit is processed through processing station 58. During this phase of the photographic cycle, the output of function 144 at line 146 is low to, in turn, block pulse transistor through gate 138.

When optical path conversion and processing is completed, the signal at line 146 converts to a high value to permit the control system to unblock the optical path. Pulse transfer to counters 170 and 172 to activate motor 100 is permitted since input line 160 to gate 156 is at a high value.

Inasmuch as the exposure evaluating binary output condition still remains at A/D converter 252, the generation of an equality signal from network 254 must be suppressed. This suppression is carried out by virtue of the now low signal value at line 278 as generated at cycle phase network 230. The low signal is introduced through line 276 to gate 274 to block the equality signal at line 272.

As shown in FIG. 6, control over the extent of activation of motor 100 now is provided from terminal position monitor 280. When counters 170 and 172 reach a binary output at their respective terminals A-D representing full opening of blades 82 and 84, the output at line 296 of gate 282 reverts to a low which, in turn, is introduced through line 298 to gate 294 as well as to cycle phase network 230 and to reset circuit 126 from along line 350.

The passage of a high signal from gate 294 to flip-flop P causes it to pass a high signal from its Q output at line 196 to flip-flop L. Flip-flop L responds to convert its F terminal output to a high value, thereby aligning it for a next succeeding photographic cycle.

Reset circuit 126 responds both to a low value at line 350 as well as to the cycle phase monitor signal at lines 278 and 346 to insert a resetting signal at AND gate 352. The opposite input to gate 352 derives from cycle phase network 230 and line 278 through line 354. Accordingly, a resetting signal is asserted through line 356 to flip-flop S to alter the Q output terminal thereof to a low value and, in turn, block a pulse train passage at gate 138. This action terminates the photographic cycle.

Figure 7:
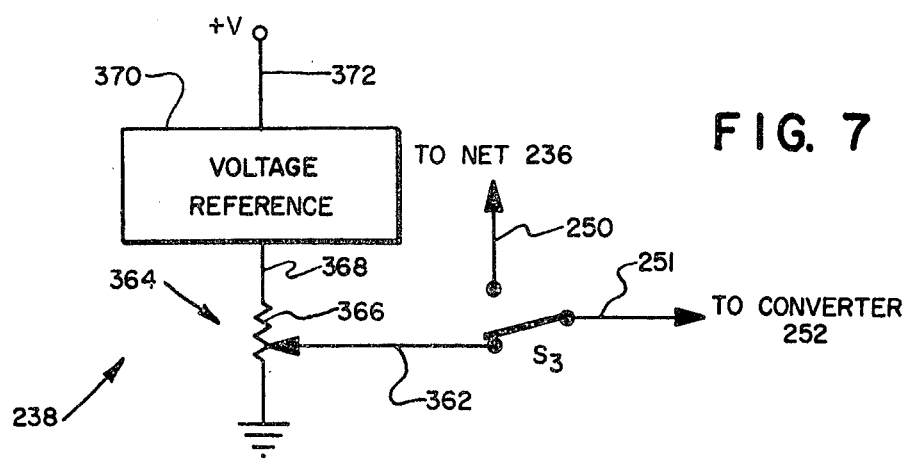
FIG. 7 is a schematic representation of a sub-circuit for manually inserting an exposure evaluation of a scene into the control arrangment shown in FIG. 5.

Referring additionally to FIGS. 7 and 1, an arrangement for manually inserting an exposure value signal into the control system of camera 10 is revealed. As shown in FIGS. 5 and 7, light evaluating network 236 is coupled with converter 252 input line 251 through a single pull double throw switch designated S$_3$. This switch is represented in FIG. 1 as manually actuable switch 360 extending through the front cover of exposure housing 16. By moving the contact of switch S$_3$ from connection with line 250 to connection with the wiper 362 of potentiometer 364, an equivalent exposure value signal may be derived. The winding 366 of potentiometer 364 is coupled within line 368 between a voltage reference network 370 and ground. Network 370, in turn, is connected through line 372 to +V. The manual adjustment of wiper 362 may be provided as shown in FIG. 1 utilizing a slideable index element as shown at 374 positioned below a line of exposure value indicia. Accordingly, should the camera operator wish to manually override the automatic exposure control system of the camera, switch S$_3$ is actuated, and element 374 is set to a predetermined exposure value. The exposure control system then responds to depression of button 114 to carry out an exposure cycle in accordance with that evaluation.

Since certain changes may be made in the above apparatus and system without departing from the scope of the invention herein involved, it is intended that all matter contained in the above description or shown in the accompanying drawings shall be interpreted as illustrative and not in a limiting sense.

What is claimed is:

1. A photographic exposure control system for a camera, the camera having means for mounting photographic material at a given focal plane, means for directing image-carrying rays from a scene along a given optical path to the camera focal plane, and selectively operable means for initiating an exposure cycle, said system comprising:
   means for selecting an exposure value;
   blade means;
   means for mounting said blade means for displacement between a position blocking the optical path and other positions unblocking the optical path, said blade means providing progressively larger aperture values through which scene light is transmitted to the focal plane as said blade means are displaced from said blocking position;
   control means responsive to the exposure initiating means for initially displacing said blade means from said blocking position in a series of timed steps to initiate an exposure interval during which scene light is directed to the focal plane and, in accordance with said exposure value, for subsequently displacing said blade means to again block the optical path thereby terminating the exposure interval, each successive step in conjunction with the time of occurrence thereof providing progressively larger step exposure values to which the film is subjected during the initial step displacement of said blade means, said control means including means responsive to said selected exposure value for halting further initial displacement of said blade means from a given step just preceding a next step having a step exposure value greater than the selected exposure value, for maintaining said blade means at said given step for an additional time after said halting which is proportional to the difference between said step exposure value of said given step and said selected value, and for subsequently displacing said blade means to block the optical path.

2. The system of claim 1 wherein said control means includes means responsive to a first signal for halting further initial displacement and, responsive to a second signal, for subsequently displacing said blade means to block the optical path, and signal means responsive to said exposure value for providing said first signal and second signal, said signal means including means for varying the elapsed time between said first and second signal in accordance with the difference between the step exposure value of said given step and said selected exposure value.

3. The system of claim 1 wherein said exposure value selecting means includes means for determining an exposure value inversely related to an evaluation of scene brightness, and said control means includes means responsive to a first signal for halting further initial displacement and, responsive to a second signal, for subsequently displacing said blade means to again block the optical path, means for determining a time dependent value corresponding to said initial displacement of said blade means, means for comparing said time dependent value with said exposure value and for providing said first signal in accordance with equality therebetween, and means for providing said second signal following said equality by an elapsed time interval proportional to the difference in time between the time of occurrence of said given step and said equality.

4. The system of claim 1 wherein said control means includes means for generating a train of pulses at a given rate and for at least initially displacing said blade means to said unblocking positions in a plurality of steps each defining progressively larger aperture values, with each successive step synchronized with each successive pulse of said train of pulses, means responsive to said exposure value for halting further displacement of said blade means from said blocking position, and means for maintaining said blade means at said given step for time after said halting which is proportional to the elapsed time between the time of the pulse synchronized with said given step and the time of halting of said blade means.

5. The system of claim 4 wherein said exposure value selecting means includes means for providing an exposure value representative of scene brightness.

6. The system of claim 4 wherein said displacing means includes drive means configured for step displacement of said blade means responsive to said train of pulses, said generating means includes means for applying said train of pulses to said drive means, and said halting means includes means for at least temporarily precluding further application of said pulses to said drive means.

7. The system of claim 1 wherein said additional time after said halting is substantially equal to the time elapsed between the time of occurrence of said given step and the time of halting.

8. An exposure control system for photographic apparatus, the apparatus having means for mounting photographic film material at a given focal plane, means for directing image-carrying light rays from a photographic scene to the focal plane, and selectively operable means for initiating an exposure cycle, said system comprising:
  means for selecting an exposure value;
  blade means;
  means for mounting said blade means for displacement between a position blocking the optical path and other positions unblocking the optical path, said blade means defining progressively increasing aperture values through which scene light is transmitted along he optical path as said blade means are displaced from said blocking position;
  drive means actuatable for displacing said blade means between said positions; and
  control means responsive to the cycle initiating means for initially actuating said drive means to displace said blade means from its said blocking position to initiate an exposure interval during which scene light is directed to the focal plane and for subsequently actuating said drive means to displace said blade means back to said blocking position to terminate said exposure interval, said control means including means for at least initially actuating said drive means to displace said blade means through a plurality of steps defining successively larger predetermined aperture values, each of said successive predetermined aperture values being achieved at progressively longer intervals of time following initiation of said exposure interval so as to define a minimum exposure initiation interval corresponding to each successive predetermined aperture value and means, responsive to said selected exposure value, for selecting the maximum predetermined aperture value achieved and for varying the exposure initiation interval between a time value ranging from less than to greater than the minimum exposure initiation interval corresponding to the next successive predetermined aperture value so as to provide optimum film exposure in accordance with said exposure value.

9. The system of claim 8 wherein said control means includes means correlated to said displacement of said blade means for deriving a time dependent value corresponding to elapsed time of said initiation interval, means for comparing said time dependent value with said exposure value and in response to substantial equivalence therebetween for halting further displacement of said drive means to the next predetermined aperture value and for maintaining said blade means at the last predetermined aperture value for a time after said eqivalence which is proportional to the difference between the time said last predetermined aperture value was initiated and the time said equivalence was achieved.

10. The system of claim 9 wherein said time after said equivalence is substantially equal to the time interval between initiation of said last aperture value and the time of achieving said equivalence.

11. The system of claim 8 wherein said drive means is energizable by a train of input pulses in a given sequence to displace said blade means in a given direction to positions providing increasing aperture values with each pulse determining initiation of displacement of said blade means to the next successive predetermined aperture value, and said control means includes means for generating said train of input pulses and for conducting said pulses to said drive means in said given sequence to displace said blade means in said given direction from said blocking position, means responsive to said exposure value for terminating the conducting of further pulses in said given sequence to said drive means to halt further displacement of said blade means in said given direction so as to define a selected predetermined aperture value, and means for varying the time at said predetermined aperture value proportional to the elapsed time between said termination of conduction and the time of the last pulse in said given sequence.

12. An exposure control system for photographic apparatus comprising:
  exposure mechanism means movable from one position to define a progressive variation of aperture values over an exposure opening and being operative to block said exposure opening to terminate the passage of light therethrough;
  drive means, pulse energizable to move said exposure mechanism means;
  light sensing means for deriving an exposure value inversely responsive to the brightness level of the scene to be photographed;
  converter means for deriving a digital representation of said exposure value;
  control means for actuating said drive means to displace said blade means from said one position to initiate an exposure interval and for subsequently actuating said drive means to displace said blade means to a position blocking the optical path so as to terminate said exposure interval, said control means including:
    first network means for counting at a given frequency while synchronously transmitting drive pulses at a submultiple of said one frequency to said drive means so as to displace said blade means from said one position;
    evaluating means for providing a given output signal responsive to equality between the count of said counting means and said digital representation;

second network means including:
   means responsive to said given output signal for temporarily precluding further transmission of said drive pulses so as to halt said drive means in a predetermined step position;
   means for subsequently initiating further transmission of drive pulses to said drive means to displace said blade means to a blocking position to terminate said exposure interval; and
   means for varying the time interval between halting of said drive means and said subsequent transmission proportional to the number of count pulses following the last drive pulse before said equivalence.

13. The exposure control system of claim 12 in which:
   said converter means digital representation is derived as a binary output, the bits thereof being arrayed from least significant to most significant;
   said first network means includes first counter means, when activated, for deriving said count as a binary output, with the bits thereof being arrayed from least significant to most significant;
   said second network means includes:
      second counter means operative to count a said given frequency and deriving a count as a binary output,
      second equality network means responsive to equality between the binary of said least significant and the next least significant bit outputs of said first counter means with said second counter means binary output for deriving a termination signal; and
      means responsive to said termination signal for initiating the said termination of said exposure interval.

14. The exposure control system of claim 13 in which said drive means includes:
   a stepper motor coupled in drive relationship with said exposure mechanism means, and
   means energizing said motor from said least significant and the next least significant bit outputs of said first counter means;
   said blade means are coupled in driven relationship with said stepper motor and movable from said one position to progressively unblock said optical path and reversibly movable into said first position to terminate said interval of exposure; and
   said second network means is operative to block transmission of said energizing drive pulses at said submultiple frequency while said second counter means operates to count at said given frequency.

15. The exposure control system of claim 14 in which:
   said blade means are coupled in driven relationship with said stepper motor and movable from said one position to progressively unblock said optical path and reversibly movable back into said one position to terminate said interval of exposure, and
   said second network means is operative to de-activate said first counter means while said second counter means operates to count at said given frequency and to reset and activate said first counter means in response to said second equality network means termination signal.

16. The exposure control system of claim 15 in which:
   said drive means includes directional logic means operative to cause said stepper motor to move said blade means from said first position and responsive to the presence of said first network means count equality to cause said stepper motor to move said blade means toward said first position in the presence of said second network means termination signal.

17. An exposure control system for photographic apparatus comprising:
   exposure mechanism means movable from a first position to define a progressive variation of aperture values over an optical path and being operative to block said optical path to terminate an interval of exposure;
   exposure evaluating means having an output signal corresponding with an exposure evaluation of a scene;
   converter means responsive to said exposure evaluating means output and operative to derive a digital representation thereof;
   means for generating energizing pulses at a given frequency;
   first counter means for counting pulses transferred thereto at said given frequency to derive a time dependent output digital representation of the number transferred;
   first equality network means responsive both to said converter means and said counter means digital representations for generating a unique signal condition when the values of said representations coincide;
   drive means including a pulse energizable motor for moving said exposure mechanism means from said first position to initiate an exposure interval and subsequently operative to cause said exposure mechanism means to block said optical path;
   pulse transfer means for pulse energizing said motor at a submultiple of said given frequency simultaneously and in correspondence with said pulse counting and operative to block the transfer of pulses to said first counter means and said motor to halt said blade means in a given position in response to said first equality network means unique signal condition; and
   vernier control means for selectively delaying said optical path blockage for a time interval substantially equal to the number of pulses at said given frequency received at said first counter means following the receipt at said motor of that pulse energizing said motor to move said exposure mechanism means into said given position.

18. The exposure control system of claim 17 in which:
   said motor is connected in driving relationship with said exposure mechanism means, said motor being pulse energizable in the presence of a first directional logic signal to move said exposure mechanism means away from said first position to a final position and pulse energizable in the presence of a second directional logic signal to move said exposure mechanism means from said final position into said first position;
   said first counter means output in a binary output, the bits thereof being arrayed from least significant to most significant;
   said system further including:

second counter means responsive to said first equality network means unique signal condition to count pulses at said given frequency and deriving said count as a binary output;

second equality network means responsive to said least significant and next least significant bit outputs of said first counter means and to said second counter means output and deriving a unique signal condition when said binary outputs are equal;

means resetting said first counter means in response to said second equality network means; and said pulse transfer means being responsive to said first equality network means for transferring pulses at said given frequency to said second counter means.

19. The exposure control system of claim 18 in which said exposure evaluating means includes:

light sensing means having a signal value responsive to the brightness level of a scene; and amplifier means responsive to said signal value for deriving said exposure evaluating means output as a signal level inversely proportional to said brightness level.

20. The exposure control system of claim 19 in which said exposure evaluating means includes:

manually adjustable means for introducing to said amplifier means a signal having a value predetermined in accordance with a photographic evaluation of a scene; and switch means manually actuable to selectively derive said exposure evaluating means output from said manually adjustable means or from said light sensing means.

21. A photographic exposure control system for a camera, the camera having means for mounting photographic material at a given focal plane, means for directing imagecarrying rays from a scene along a given optical path to the camera focal plane, and selectively operable means for initiating an exposure cycle, said system comprising:

means for selecting an exposure value, said exposure value selecting means including means for determining an exposure value inversely proportional to scene brightness;

blade means;

means for mounting said blade means for displacement between a position blocking the optical path and another position unblocking the optical path, said blade means providing changing aperture values through which scene light may pass to the focal plane as said blade means are displaced from said blocking position;

drive means for displacing said blade means through a plurality of steps responsive to a train of step pulses;

control means responsive to the exposure initiating means for counting at a first pulse rate and for applying step pulses to said drive means at a second pulse rate which is a submultiple of said first to initially displace said blade means from said blocking position to said other position to initiate an exposure interval during which scene light is directed to the focal plane and, in accordance with said exposure value, for subsequently displacing said blade means to again block the optical path thereby terminating the exposure interval, said control means including means responsive to said selected exposure value for halting said initial displacement of said blade means at a location defining a predetermined aperture value, for maintaining said blade means at said location for a time determined in accordance with said exposure value and said predetermined aperture and for subsequently displacing said blade means to block the optical path, said means for halting said initial displacement including means for comparing the count of said counting means with said exposure value and, responsive to equivalence therebetween, for precluding further application of said step pulses to said drive means to halt said displacement of said blade means, and said means for maintaining said blade means at said location including means for then actuating said drive means to displace said blade means back to its said blocking position following the occurrence after said equivalence of a number of pulses at said first pulse rate proportional to the number of pulses at said first rate following the last step pulse applied prior to said equivalence.

22. The system of claim 21 wherein said number of pulses after said equivalence is equal to said number of pulses following said last step pulse so that said drive and blade means is maintained at said predetermined aperture value for a time equal to twice said number of pulses before equivalence but following said last step pulse.

23. A photographic exposure control system for a camera, the camera having means for mounting photographic material at a given focal plane, means for directing image-carrying rays from a scene along a given optical path to the camera focal plane, and selectively operable means for initiating an exposure cycle, said system comprising:

means for selecting an exposure value;

blade means;

means for mounting said blade means for displacement between blocking and unblocking relation to the optical path and for defining at least one of a plurality of incrementally different aperture values in operative relation to the optical path;

control means responsive to the exposure initiating means for displacing said blade means from said blocking relation into said unblocking relation and for defining at least one aperture value in operative relation to the optical path so as to initiate an exposure interval during which scene light is transmitted along the optical path and for then displacing said blade means back into blocking relation to the optical path to terminate the exposure interval, said control means including;

means for determining one exposure time programmed in accordance with a predetermined aperture value and, the selected exposure value;

means for selecting from said plurality of aperture values a final aperture value not greater than said predetermined aperture value and for determining another exposure time programmed in accordance with the final aperture value; and means for maintaining said blade means at said final aperture value, following said one exposure time, for an additional time proportional to the difference in time between said one and said other exposure times.

24. The system of claim 23 wherein said control means includes means for providing a first timing signal responsive to said other exposure time means, means for providing a second timing signal responsive to said one exposure time means, for providing a third timing signal following said second timing signal by an interval proportional to the time between said first and second signals, and means responsive to said third signal for displacing said blade means back into a blocking relation to the optical path.

* * * * *